(12) United States Patent  
Kuter-Arnebeck

(10) Patent No.: US 11,904,438 B2
(45) Date of Patent: Feb. 20, 2024

(54) FASTENER RETENTION AND ANTI-CAMOUT TOOL BIT

(71) Applicant: Snap-on Incorporated, Kenosha, WI (US)

(72) Inventor: Ottoleo Kuter-Arnebeck, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/974,984

(22) Filed: Oct. 27, 2022

(65) Prior Publication Data

US 2023/0050744 A1 Feb. 16, 2023

Related U.S. Application Data

(62) Division of application No. 16/582,793, filed on Sep. 25, 2019, now Pat. No. 11,541,516.

(51) Int. Cl.
| | |
|---|---|
| *B23K 9/04* | (2006.01) |
| *B25B 15/00* | (2006.01) |
| *C23C 26/02* | (2006.01) |
| *B25B 23/00* | (2006.01) |
| *B23B 51/00* | (2006.01) |

(52) U.S. Cl.
CPC ............ *B25B 15/002* (2013.01); *B23B 51/00* (2013.01); *B23K 9/044* (2013.01); *B25B 23/00* (2013.01); *C23C 26/02* (2013.01)

(58) Field of Classification Search
None
See application file for complete search history.

(56) References Cited

U.S. PATENT DOCUMENTS

| | | |
|---|---|---|
| 2,116,775 A | 3/1936 | Blackburn |
| 3,133,568 A | 5/1964 | Reed |
| 3,211,199 A | 10/1965 | Reed, II |

(Continued)

FOREIGN PATENT DOCUMENTS

| | | |
|---|---|---|
| CN | 1095419 | 12/2002 |
| CN | 1424954 | 6/2003 |

(Continued)

OTHER PUBLICATIONS

TWI, "What is electrospark deposition (ESD)?", Oct. 29, 2017 (date stamped by Wayback machine), TWI Global, accessed online Mar. 30, 2023 at www.twi-global.com/technical-knowledge/faqs/faq-what-is-electrospark-deposition-esd (Year: 2017).*

(Continued)

*Primary Examiner* — Humera N. Sheikh
*Assistant Examiner* — Kim S. Horger
(74) *Attorney, Agent, or Firm* — Seyfarth Shaw LLP

(57) ABSTRACT

A tool bit with a surface layer metallurgically bonded on a substrate layer using electrospark deposition (ESD) that allows the tool bit to reduce camout and engage a fastener head for one-handed starting and removal. The surface layer has a rougher finish, compared to conventional tool bits, and therefore better grips engagement surfaces of a mating recess of the fastener during use. The reduction of camout provides greater durability to the tool bit and resists erosion and wear of the engagement surfaces of the fastener.

8 Claims, 5 Drawing Sheets

(56) References Cited

U.S. PATENT DOCUMENTS

| | | | |
|---|---|---|---|
| 3,415,971 | A | 12/1968 | Shaffer |
| 3,524,956 | A | 8/1970 | Rocklin |
| 3,614,373 | A | 10/1971 | Skilling |
| 3,616,827 | A | 11/1971 | Stillwagon |
| 3,656,522 | A | 4/1972 | Ingimarsson |
| 3,751,283 | A | 8/1973 | Dawson |
| 3,763,343 | A | 10/1973 | Rocklin |
| 3,903,761 | A | 9/1975 | Runton |
| 4,029,734 | A | 6/1977 | Stauter |
| 4,405,851 | A | 9/1983 | Sheldon |
| 4,778,730 | A | 10/1988 | Zucker |
| 5,148,726 | A | 9/1992 | Huebschen et al. |
| 5,259,280 | A | 11/1993 | Hoy |
| 5,291,811 | A | 3/1994 | Goss |
| 5,660,091 | A | 8/1997 | Stone |
| 5,704,261 | A | 1/1998 | Strauch et al. |
| 5,868,047 | A | 2/1999 | Faust et al. |
| 5,897,966 | A | 4/1999 | Grossklaus, Jr. |
| 5,953,969 | A | 9/1999 | Rosenhan |
| 6,146,476 | A | 11/2000 | Boyer |
| 6,152,000 | A | 11/2000 | Mowins |
| 6,299,750 | B1 | 10/2001 | Pilgenroder et al. |
| 6,336,950 | B1 * | 1/2002 | Koizumi ............... C23C 26/00 419/48 |
| 6,655,241 | B2 | 12/2003 | Kozak |
| 6,883,405 | B2 | 4/2005 | Strauch |
| 7,139,633 | B2 | 11/2006 | Mazumder et al. |
| 7,168,348 | B2 | 1/2007 | Holland-Letz |
| 8,025,134 | B2 | 9/2011 | Fogel |
| 9,273,527 | B2 | 3/2016 | Badrak |
| 9,314,907 | B2 | 4/2016 | Wang |
| 9,393,984 | B2 | 7/2016 | Culf |
| 9,739,105 | B2 | 8/2017 | Badrak |
| 11,541,516 | B2 * | 1/2023 | Kuter-Arnebeck ..... B23B 51/00 |
| 2002/0129680 | A1 | 9/2002 | Holland |
| 2003/0087097 | A1 | 5/2003 | Lukschandel |
| 2003/0196527 | A1 | 10/2003 | Strauch |
| 2004/0055421 | A1 | 3/2004 | Bangert |
| 2005/0076749 | A1 | 4/2005 | Liu |
| 2006/0037431 | A1 | 2/2006 | Bernhard et al. |
| 2006/0283843 | A1 * | 12/2006 | Soma Raju ............ C23C 26/00 219/76.13 |
| 2009/0103993 | A1 | 4/2009 | Spiro |
| 2011/0098715 | A1 | 4/2011 | Laubert |
| 2013/0047798 | A1 | 2/2013 | Huang |
| 2014/0260833 | A1 | 9/2014 | Kana |
| 2015/0115635 | A1 | 4/2015 | Freyvogel et al. |
| 2015/0165538 | A1 | 6/2015 | Shijie et al. |
| 2015/0273606 | A1 | 10/2015 | Scotchmer et al. |
| 2015/0354079 | A1 | 12/2015 | Tomlinson |
| 2016/0017450 | A1 * | 1/2016 | Kislov ................. C21D 1/09 219/76.13 |
| 2018/0311798 | A1 | 11/2018 | Neitzell |
| 2018/0326563 | A1 | 11/2018 | DeBaker |
| 2019/0291246 | A1 | 9/2019 | Wang |

FOREIGN PATENT DOCUMENTS

| | | |
|---|---|---|
| DE | 4029734 | 3/1992 |
| DE | 19614961 | 2/1997 |
| EP | 1149668 | 10/2001 |
| EP | 3061849 | 8/2016 |
| GB | 2063743 | 6/1981 |
| JP | S57110238 | 7/1982 |
| JP | 2011177815 | 9/2011 |
| TW | 277378 | 6/1996 |
| TW | 567950 | 12/2003 |
| TW | M339395 | 9/2008 |
| TW | M367782 | 11/2009 |
| TW | M568761 | 10/2018 |
| WO | 2018098700 | 6/2018 |

OTHER PUBLICATIONS

MatWeb, Material Property Data for Tungsten Carbide, accessed online Sep. 22, 2020 at www.matweb.com. (Year: 2020).

Cab Incorporated, Surface Roughness Conversion, accessed online Sep. 23, 2020 at www.cabinc.com/uploads/news/surface_roughness_conversion.pdf (Year: 2020).

Penyashi et al., "Investigation of Properties and Wear of WC, TIC and TiN Based Multilayer Coatings Applied onto Steels C45, 210CR12 and HS6 5-2 Deposited by Non-Contact Electrospark Process," 2018, Journal of the Balkan Tribological Association, vol. 23, No. 2, p. 325-342. (Year: 2017).

Examination Report for Application No. 2020213319 dated Mar. 19, 2021, 7 pages.

Combined Search and Examination Report for Application No. GB2012534.0 dated Jan. 27, 2021, 8 pages.

Taiwan Office Action for corresponding TW Application No. 109133145 dated May 10, 2021, 9 pages.

Canadian Office Action for corresponding CA Application No. 3,091,379 dated Oct. 15, 2021, 3 pages.

United Kingdom Office Action for corresponding UK Application No. GB2012534.0 dated Nov. 10, 2021, 5 pages.

Chinese Office Action for corresponding Application No. 202011012694.2 dated Feb. 11, 2022, 13 pages.

Examination Report No. 2 for corresponding Application No. 2020213319 dated Mar. 4, 2022, 3 pages.

* cited by examiner

FASTENER RETENTION AND ANTI-CAMOUT TOOL BIT

CROSS REFERENCES TO RELATED APPLICATIONS

This application is a divisional of and claims the benefit of U.S. patent application Ser. No. 16/582,793, filed Sep. 25, 2019, the contents of which are incorporated herein by reference in their entirety.

TECHNICAL FIELD OF THE INVENTION

The present invention relates generally to tool bits. More particularly, the present invention relates to tool bits, such as cross-cut screw driver bits (also known as Philips), with a fastener retention and anti-camout surface layer.

BACKGROUND OF THE INVENTION

Tool bits are often used to apply torque to a threaded fastener, such as a cross-cut type screw, also known as a Philips, headed screw. However, the cross-cut type screw features tapered engagement surfaces that often cause the tool bit to slip out of a mating recess disposed in the head of the screw being driven once torque required to turn the screw exceeds a certain amount. This process is called cam-out. Repeated instances of cam-out causes erosion and wear of the engagement surfaces of the mating recess, as well as the tool bit, which further exacerbates the problem of cam-out, and which often results in the fastener head being "stripped," so its removal is more difficult and can no longer properly engage a tool bit. In an attempt to minimize cam-out, current solutions machine or form surface features on the tool bit that bite and/or cut into the mating recess of the fastener, such as, for example, per Snap-on Tools' "anti-cam out ribbing", U.S. Pat. No. 6,655,241, and US2013/0047798. Another solution is to perform surface hardening of the engagement surfaces of the tool bit, such as, for example, laser cutting patterns into the tool bit that causes a hard surface to form at the edges of the cut, per U.S. Pat. No. 6,883,405, and/or peening the surface to achieve a high friction finish per U.S. Pat. Nos. 3,133,568 and 3,903,761. Yet another solution is to adhere hard particles, such as carbide or diamonds, onto the engagement surfaces of the tool bit by brazing, soldering, arc melting, or using adhesives per U.S. Pat. Nos. 8,025,134, 5,259,280, 4,778,730, US2004/0055421, US2005/0076749, US2003/0087097, and GB2063743.

Tool bits are also often used to retain a fastener to facilitate one-handed starting and removal of the fastener. This retention is typically achieved by magnetizing the tool bit, which does not work with aluminum or stainless steel fasteners. Other solutions add a friction element to the engagement surfaces of the tool bit, such as, for example, a thin polymer layer per U.S. Pat. No. 3,616,827, polymer plugs per U.S. Pat. No. 9,314,907, springs per US2014/0260833, US2011/0098715, and EP1149668, and/or machining the tool bit to form a taper that allows the tool bit to wedge into the mating recess of the fastener per U.S. Pat. Nos. 5,291,811, 6,152,000, and 5,660,091.

SUMMARY OF THE INVENTION

The present invention broadly relates to a tool bit with a hard and grip enhancing surface layer metallurgically bonded onto a softer substrate layer that allows the tool bit to minimize camout, and also retain a fastener for one-handed starting and removal. In an embodiment, the surface layer is deposited onto the substrate using an electrospark deposition method (ESD) to produce a rougher finish, compared to conventional tool bits, and therefore able to better grip engagement surfaces of a mating recess of the fastener during use. Moreover, an additional benefit of reducing camout provides greater durability to the tool bit and resists erosion and wear of the engagement surfaces of the mating recess of the fastener.

In an embodiment, the present invention is a tool broadly comprising a shank portion, and a tip portion adapted to engage a fastener, wherein the tip portion includes a surface layer disposed on a substrate layer using ESD. For example, in an embodiment, the surface layer can be disposed on lands, engagement surfaces, flutes, end, or a combination thereof of the tip portion.

In another embodiment, the present invention is a method of manufacturing a tool broadly comprising forming geometric features of a tip portion in the stock material, applying electrical pulses to a consumable electrode material, generating a plasma arc between the consumable electrode material and the geometric features, and applying a surface layer on a desired portion of the geometric features. For example, the surface layer can be disposed on lands, engagement surfaces, flutes, an end, or a combination thereof of the tip portion.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
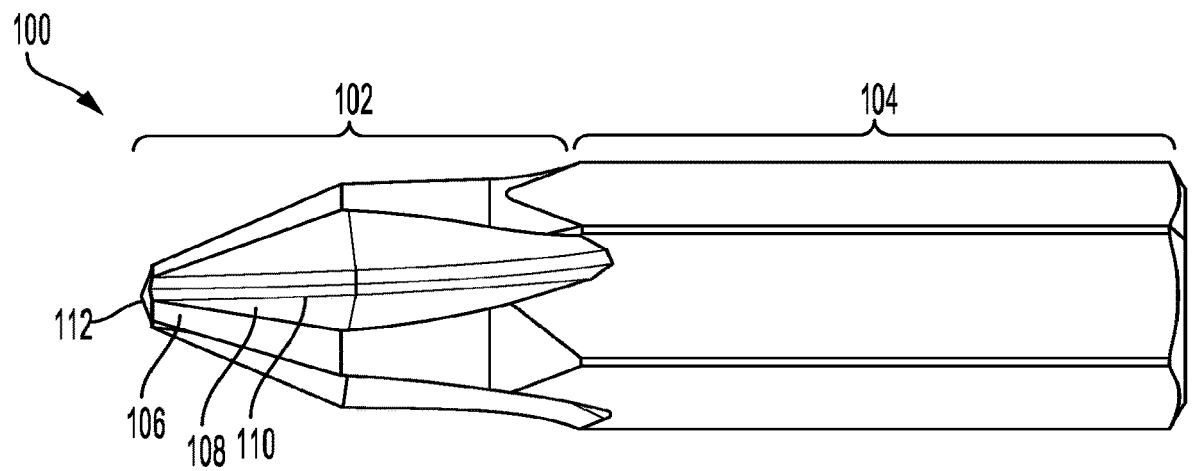
FIG. 1 is a side plan view of an embodiment of a tool bit in accordance with an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly relates to a tool bit with a hard and rough surface layer metallurgically bonded on a softer substrate layer using electrospark deposition (ESD). The surface layer is deposited to produce a roughened finish that allows the tool bit to better grip a fastener and thus reduce camout and also retain a fastener for one-handed starting and removal.

Referring to FIGS. 1 through 9, a tool bit 100 includes a tip portion 102 and a shank portion 104. The tip portion 102 may be adapted to engage a mating recess on top of a helically-threaded fastener (not shown), and the shank portion 104 may be adapted to engage a bit driver (not shown).

Figure 2:
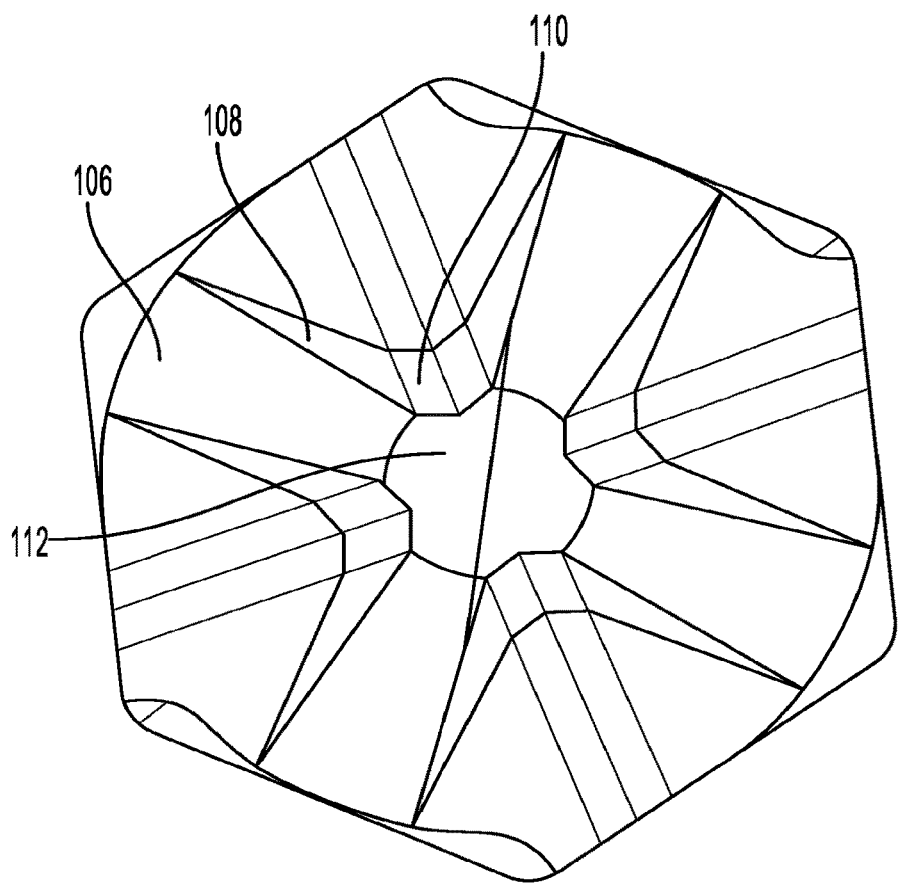
FIG. 2 is a front plan view of the tool bit of FIG. 1.
Figure 3:
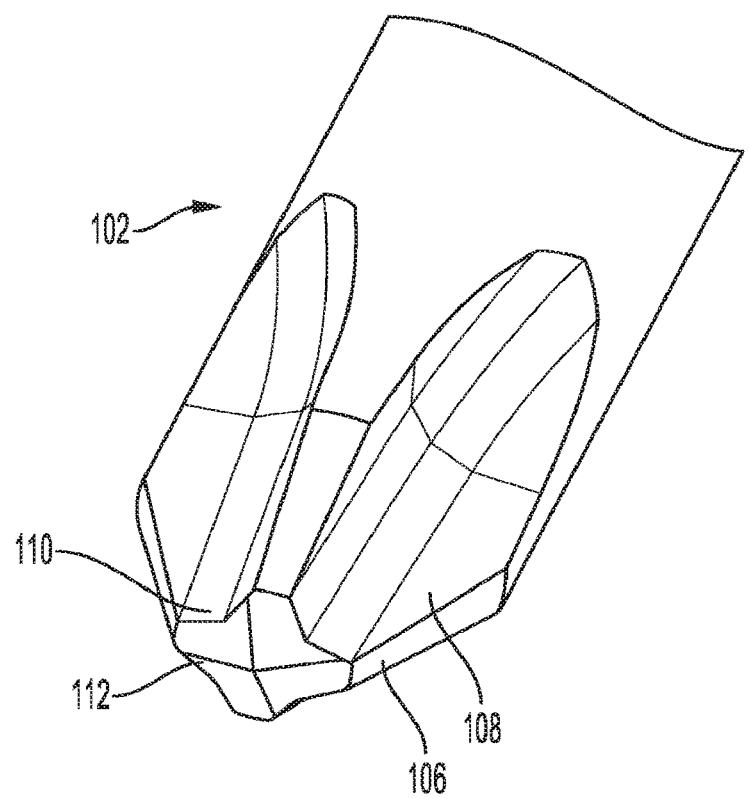
FIG. 3 is a side perspective view of a tip portion of the tool bit of FIG. 1.

The tip portion 102 can be machined, cast or otherwise formed from the shank portion 104. As illustrated, the tip portion 102 may be adapted to engage a cross-cut mating recess of the head of a fastener (typically known as a Phillips screw). Although, the tip portion 102 can be adapted to engage various types of mating recesses, it will be appreciated that the present invention is not so limited, and can be used with other tool bit types, such as, for example, flat blade, Torx, hex, square, etc. The tip portion 102 can include geometric features such as flutes 106, engagement surfaces 108, lands 110 between the flutes 106, and an end 112. As shown in FIG. 2, the tip portion can include four lands 110, eight engagement surfaces 108, and four flutes 106. However, any combination of geometric features may be used depending on the type of mating recess that the tip portion 102 is adapted to engage. The flutes 106 can taper towards the end 112. The engagement surfaces 108 can be slanted at an angle towards the end 112.

The tip portion 102 includes a surface layer disposed on a substrate layer. In an embodiment, the surface layer can be harder than the substrate layer. The substrate layer can be made of a composite metal construction, such as steel or other suitable material, as well known to those skilled in the art. The surface layer can be made of a carbide based metal, such as, for example, tungsten carbide, chrome carbide, titanium carbide, tantalum carbide, hafnium carbide, molybdenum carbide, zirconium carbide, vanadium carbide, niobium carbide, etc., or other suitable alloys with suitable roughness and hardness, such as, for example, stellite, tribaloy, colmonoy, borides of chrome, titanium, zirconium, and tantalum, intermetallic, cermet, etc.

The surface layer is metallurgically bonded on the substrate layer by ESD. The parameters of ESD (frequency of current, raster rate, etc.) can be selected such that the heat affected zone of the substrate layer is controlled and approximately the same depth or less depth as the surface layer.

Figure 4:
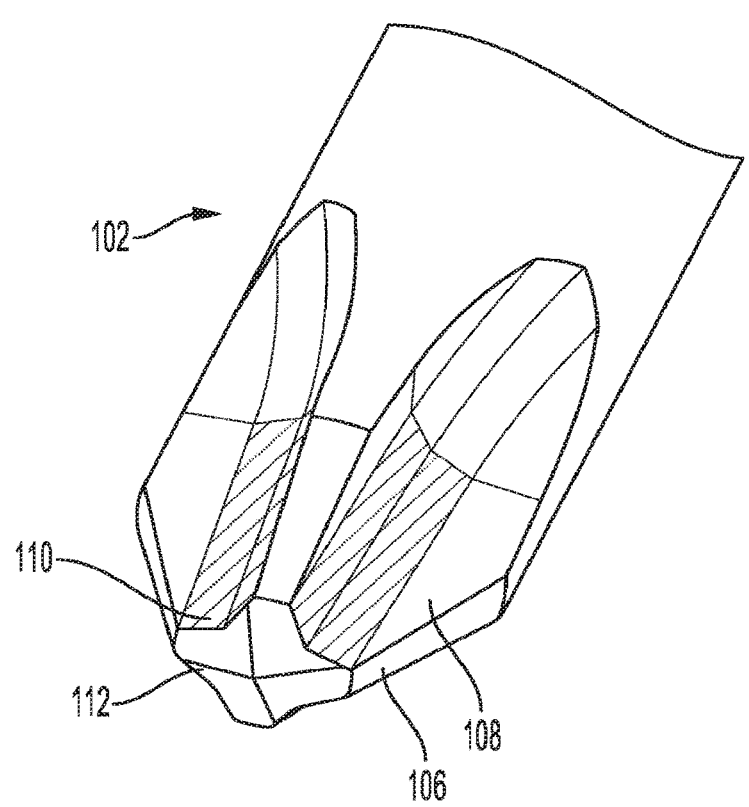
FIG. 4 is a side perspective view of a tip portion of a tool bit according to another embodiment of the present invention.
Figure 5:
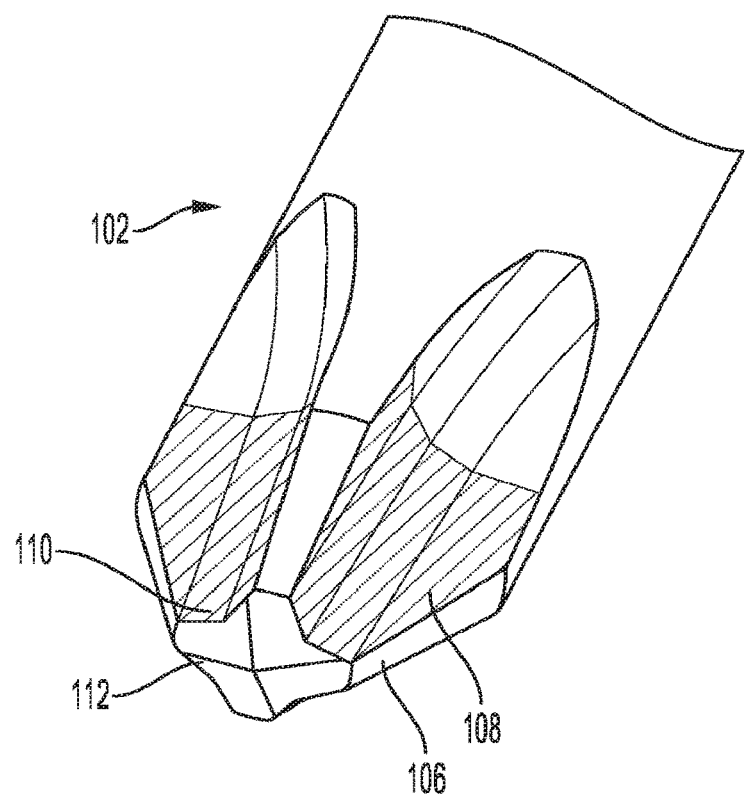
FIG. 5 is a side perspective view of a tip portion of a tool bit according to another embodiment of the present invention.
Figure 6:
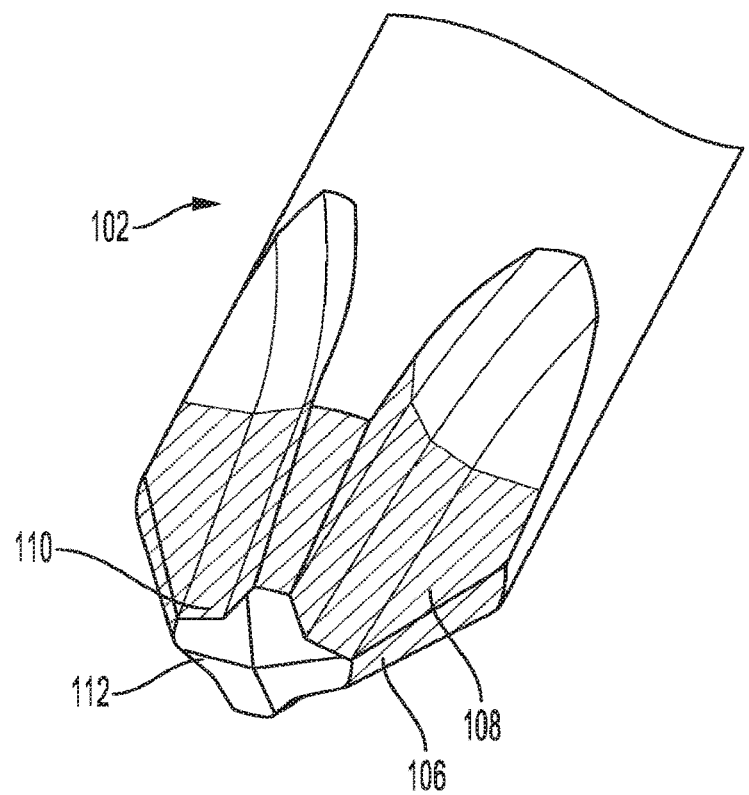
FIG. 6 is a side perspective view of a tip portion of a tool bit according to another embodiment of the present invention.
Figure 7:
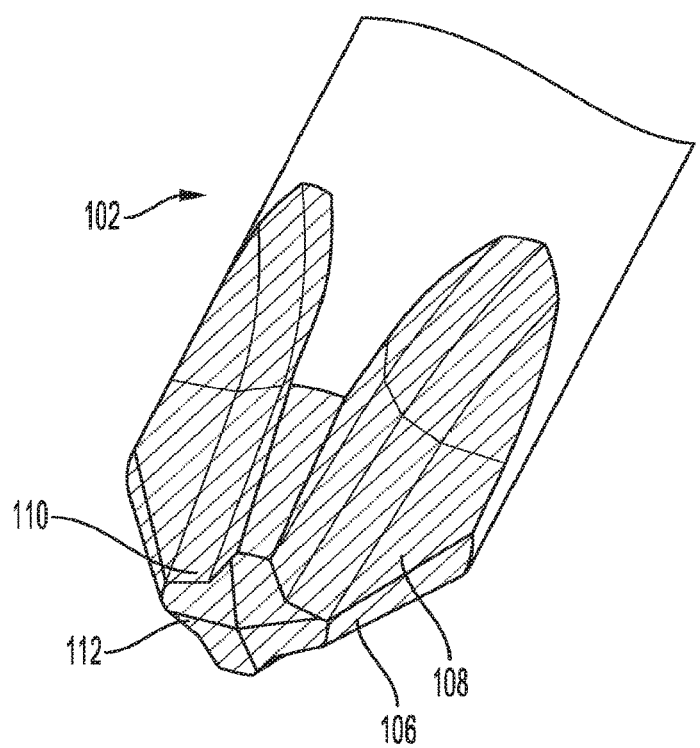
FIG. 7 is a side perspective view of a tip portion of a tool bit according to another embodiment of the present invention.

In an embodiment, the surface layer is applied onto the lands 110, as shown in FIG. 4 with the hatch marks. In another embodiment, the surface layer is applied onto the engagement surfaces 108 and the lands 110, as shown in FIG. 5 with the hatch marks. In another embodiment, the surface layer is applied on the flutes 106, the engagement surfaces 108, and the lands 110, as shown in FIG. 6 with the hatch marks. In another embodiment, the surface layer is applied on the lands 110, the engagement surfaces 108, the flutes 106, and the end 112, as shown in FIG. 7 with the hatch marks. However, the invention is not limited to the embodiments described, and the surface layer can be applied in a discrete pattern or as a continuous layer on all or part of the tip portion 102 and/or all or part of the shank portion 104.

In an embodiment, the surface layer preferably has a hardness between about 50 HRC to about 100 HRC, a thickness between about 0.0001 inches (about 2.5µ) to about 0.002 inches (about 51µ, and a roughness of 10 to 30 µinches RMS (about 0.254µ to about 0.762µ). The surface layer may be deposited over nickel, nickel/chrome, or other known surface finishes, and/or oxide, phosphate, or other known surface treatments. The surface layer may also be applied to pre-or post-heat treated substrate layer.

The shank 104 may be any desired length and may be hollow or solid construction. Although illustrated as having a hexagonal cross-section, the shank 104 may have other cross-sections, such as a square or other suitable drivable shape for being driven by a bit driver (not shown). The bit driver may be a ratchet wrench, a drill, a screwdriver, etc. In an embodiment, the shank portion 104 may be integrally formed into a handle portion or otherwise adapted to be matingly engaged with a driver.

Figure 8:
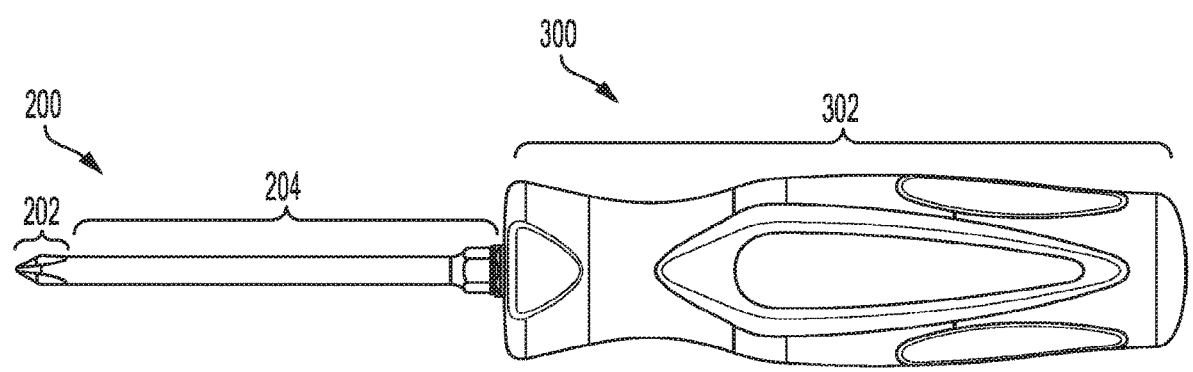
FIG. 8 is a side plan view of another embodiment of a tool bit of the present invention integrated with a hand tool.
Figure 9:
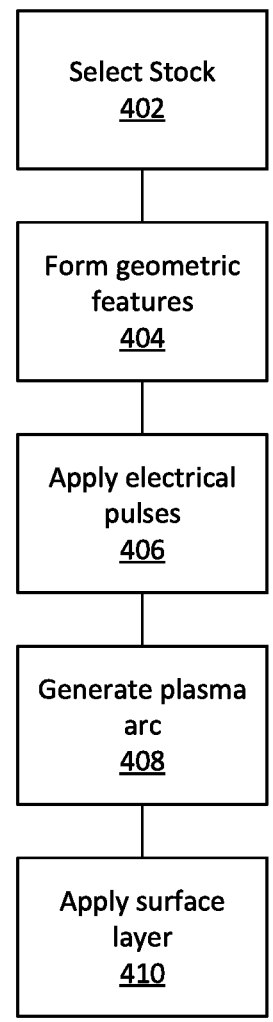
FIG. 9 is a flow diagram illustrating a method of manufacturing an embodiment of a tool bit of the present invention.

An embodiment of a method 400 of manufacturing a tool bit 100 is shown in FIG. 9. With references to FIGS. 1-9, in an embodiment, the method, at step 402, includes forming a portion of a tool bit 100, such as the substrate layer of the tip portion 102, with desired performance characteristics. As stated above, the substrate layer of the tip portion 102 can be made of a composite metal construction, such as steel or other suitable material. Accordingly, the material's performance characteristics are imparted by the material's state of the stock material and the formation steps such as cold-working applied to the stock material. Therefore, the desired resulting material's state for the tip portion 102 can be accommodated by an appropriate selection of stock. For instance, stock material may be cold rolled, or hot rolled, etc., or the stock may otherwise be prepared prior to formation of a plurality of tool bits 100 therefrom.

The method, at step 404, includes forming the geometric features of the tip portion 102 from the stock. The geometric features of the tip portion 102 can include flutes 106, engagement surfaces 108, lands 110 between the flutes 106, and an end 112. In an example, the geometric features may be machined from the stock.

The surface layer is metallurgically bonded on the substrate layer by ESD. Accordingly, at step 406, the method includes applying electrical pulses to a consumable electrode material, such as carbide based metal or other suitable alloy. For example, the consumable electrode material is tungsten carbide, chrome carbide, titanium carbide, tantalum carbide, hafnium carbide, molybdenum carbide, zirconium carbide, vanadium carbide, niobium carbide, etc., or other suitable alloys with suitable roughness and hardness, such as stellite, tribaloy, colmonoy, borides of chrome, titanium, zirconium, and tantalum, intermetallic, cermet, etc.

At step 408, a plasma arc is generated between the consumable electrode material and the geometric features of the tip portion 102. The plasma arc ionizes the consumable electrode material and a small quantity of molten material is transferred onto the desired geometric features, thereby applying the surface material on the desired geometric features of the tip portion at step 410. The transfer of material is rapid, and the self-quenching is extremely fast. Based on short duration, high current electrical pulses, the method 400 imparts a low heat input to the substrate material, resulting in little or no modification of the substrate microstructure.

In another embodiment, the tool bit 200 is an integrated part with a hand tool 300, such as a screwdriver, as illustrated in FIG. 8. In this embodiment, the tip portion 202 is the same as described above, except a handle 302 of the hand tool 300 is integrated with the shank portion 204.

Therefore, the tool bit 100 has a thin, high friction, and wear resistant surface layer that has a high hardness disposed over a softer substrate layer, thereby reducing the chance of a brittle failure typical with high-hardness carbide like steels. The surface layer enables the tool bit 100 to better engage the fastener with the tip portion 102 when the mating recess of the fastener is wedged onto the tip portion 102. This retention effect is most pronounced when the surface layer is disposed at least in the lands 110 of the tip portion 102 and may be enhanced by a more uniform coating on the engagement surfaces 108 and the flutes 106. This configuration also reduces camout.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of manufacturing a tool, the method comprising:
   forming a tip portion of the tool with a stock material, wherein the tip portion has geometric features and is adapted to engage a fastener;
   applying electrical pulses to a consumable electrode material;
   generating a plasma arc between the consumable electrode material and the geometric features; and
   applying a surface layer having a surface layer thickness and a roughness of about 10 to about 30 µinches RMS on a desired portion of the geometric features, wherein a heat affected zone of the stock material has a depth extending from the surface layer into the stock material, and the depth is greater than zero and less than or substantially equal to the surface layer thickness.

2. The method of claim 1, wherein the stock material is composed of a composite metal construction and the consumable electrode material is composed of a carbide based metal.

3. The method of claim 1, wherein the surface layer is composed of tungsten carbide, chrome carbide, titanium carbide, tantalum carbide, hafnium carbide, molybdenum carbide, zirconium carbide, vanadium carbide, niobium carbide, stellite, tribaloy, colmonoy, borides of chrome, titanium, zirconium, and tantalum, intermetallic, or cermet.

4. The method of claim 1, wherein generating the plasma arc includes ionizing the consumable electrode material to be transferred onto the desired portion of the geometric features.

5. The method of claim 1, wherein the step of forming the tip portion includes forming the geometric features, wherein the geometric features include flutes, engagement surfaces, lands between the flutes, and an end.

6. The method of claim 5, wherein applying the surface layer includes applying the surface layer on one or more of the lands, the engagement surfaces, the flutes, and the end.

7. The method of claim 1, wherein applying the surface layer includes applying the surface layer having a hardness of about 50 HRC to about 100 HRC.

8. The method of claim 1, wherein applying the surface layer includes applying the surface layer to the surface layer thickness of about 0.0001 inches to about 0.002 inches.

* * * * *